United States Patent
Noguchi et al.

(10) Patent No.: US 8,834,961 B2
(45) Date of Patent: Sep. 16, 2014

(54) MAGNETIC RECORDING MEDIUM MANUFACTURING APPARATUS

(75) Inventors: Tomoyuki Noguchi, Kawasaki (JP); Katsuo Hara, Ichihara (JP); Masato Saito, Ichihara (JP); Yushi Kinoshita, Ichihara (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/577,600

(22) PCT Filed: Jan. 25, 2011

(86) PCT No.: PCT/JP2011/051346
§ 371 (c)(1),
(2), (4) Date: Aug. 7, 2012

(87) PCT Pub. No.: WO2011/096300
PCT Pub. Date: Aug. 11, 2011

(65) Prior Publication Data
US 2012/0308721 A1 Dec. 6, 2012

(30) Foreign Application Priority Data
Feb. 8, 2010 (JP) ................................. 2010-025997

(51) Int. Cl.
*B05D 1/18* (2006.01)
*G11B 5/84* (2006.01)

(52) U.S. Cl.
CPC ............... *G11B 5/8408* (2013.01); *B05D 1/18* (2013.01)
USPC ....................................................... 427/127

(58) Field of Classification Search
None
See application file for complete search history.

(56) References Cited

FOREIGN PATENT DOCUMENTS

| JP | 6-150307 A | 5/1994 |
| JP | 8-281190 A | 10/1996 |
| JP | 11-138088 A | 5/1999 |
| JP | 2007095208 | * 4/2007 ............... G11B 5/84 |

OTHER PUBLICATIONS

English Machine Translation of JP08-281190. Accessed on PAJ website Nov. 28, 2013.*
Merriam-Webster definition of "vertical" <http://www.merriam-webster.com/dictionary/vertical>.*
International Search Report for PCT/JP2011/051346 dated Apr. 19, 2011.

* cited by examiner

*Primary Examiner* — Mandy Louie
(74) *Attorney, Agent, or Firm* — Sughrue Mion, PLLC

(57) ABSTRACT

Provided is a magnetic recording medium manufacturing apparatus capable of forming a lubricant film with a uniform thickness on the surface of a magnetic recording medium. The magnetic recording medium manufacturing apparatus includes a hanger mechanism (2) that is inserted into a central hole (100a) of a magnetic recording medium (100) and supports the magnetic recording medium (100) in a suspended state and a lifting mechanism (3) that lifts and lowers one of the hanger mechanism (2) and the dip tank (1) relative to the other. The hanger mechanism (2) includes supporting plates (4a, 4b) that have upper ends coming into contact with an inner circumferential portion of the magnetic recording medium (100) and baffle plates (7a, 7b) that have upper ends disposed below the upper ends of the supporting plates (4a, 4b) such that a gap is formed between the upper end of the baffle plate and the inner circumferential portion of the magnetic recording medium (100) and are provided so as to face the supporting plates (4a, 4b).

4 Claims, 10 Drawing Sheets

CROSS-SECTIONAL VIEW TAKEN ALONG LINE X-X'

CROSS-SECTIONAL VIEW TAKEN ALONG LINE Y-Y'

MAGNETIC RECORDING MEDIUM MANUFACTURING APPARATUS

TECHNICAL FIELD

The present invention relates to a magnetic recording medium manufacturing apparatus that dips a disk-shaped magnetic recording medium with a central hole into a dip tank filled with a liquid lubricant and draws up the magnetic recording medium from the dip tank, thereby forming a lubricant film on the surface of the magnetic recording medium.

Priority is claimed on Japanese Patent Application No. 2010-025997, filed Feb. 8, 2010, the content of which is incorporated herein by reference.

BACKGROUND ART

In recent years, in the field of magnetic recording media used in, for example, a hard disk drive (HDD), there has been a marked increase in recording density and the recording density has increased at a high rate of about 1.5 times per year. There are various techniques for supporting the improvement in recording density. For example, one of the key technologies is controlling sliding characteristics between a magnetic head and the magnetic recording medium.

For example, since a CSS (contact start stop) type, which is called a Winchester type, in which a basic operation from the start to the stop of the magnetic head for the magnetic recording medium is performed in the order of contact sliding, floating, and contact sliding is mainly used in the HDD, the contact sliding of the magnetic head on the magnetic recording medium is inevitable.

Therefore, tribology between the magnetic head and the magnetic recording medium is a critical problem and efforts to improve a protective film formed on a magnetic film of the magnetic recording medium have continued. In addition, abrasion resistance and sliding resistance on the surface of the medium are main factors for improving the reliability of the magnetic recording medium.

As the protective film of the magnetic recording medium, films made of various materials have been proposed. However, a carbon film has been mainly used, considering all factors including a film-forming performance and durability. In addition, for example, since the hardness, density, and dynamic friction coefficient of the carbon film are directly reflected in the CSS characteristics or corrosion resistance characteristics of the magnetic recording medium, they are very important.

However, when only the protective film is provided, the durability of the magnetic recording medium deteriorates. Therefore, a lubricant film is formed on the surface of the protective film. The lubricant film has the following main functions: a function of preventing, for example, the protective film of the magnetic recording medium from being directly exposed to the air to improve the corrosion resistance of the magnetic recording medium; a function of preventing a direct contact between a magnetic head slider and the protective film when the magnetic head slider incidentally comes into contact with a data surface of the magnetic recording medium; and a function of significantly reducing the frictional force of the magnetic head slider when the magnetic head slider slides on the magnetic recording medium.

The thickness of the lubricant film formed on the surface of the magnetic recording medium is strictly managed in the range of sub-nanometers. As a method of forming the lubrication film, a so-called dipping method has been widely used which dips a magnetic recording medium in a dip tank filled with a liquid lubricant and draws up the magnetic recording medium from the dip tank, thereby forming a lubricant film with a uniform thickness on the surface of the magnetic recording medium (for example, see PTL 1). In the dipping method, in general, a batch processing method is used in terms of mass production and a plurality of magnetic recording media arranged in a line are dipped into the dip tank and are collectively processed.

CITATION LIST

Patent Literature

[PTL 1] JP-A-6-150307

SUMMARY OF INVENTION

Technical Problem

However, in a lubrication film coating method using the above-mentioned dipping method, when the magnetic recording medium is drawn up from the dip tank, it is important to draw up the magnetic recording medium at a constant speed such that the level of the liquid lubricant does not fluctuate. The reason is that, when the level of the liquid lubricant fluctuates, linear coating unevenness occurs in the thickness distribution of the lubricant film formed on the surface of the magnetic recording medium.

Specifically, the magnetic recording medium dipped into the dip tank is supported in a suspended state by a hanger which is inserted into the central hole of the magnetic recording medium. When the hanger is drawn up from the dip tank filled with the liquid lubricant, the level of the liquid lubricant varies (fluctuates). In particular, when the hanger is drawn out above the liquid level, droplets (liquid pool) attached to the hanger are splashed or trickle. As a result, unevenness is likely to occur in the thickness distribution of the lubricant film formed on the surface of the magnetic recording medium.

In the description of PTL 1, in order to solve the above-mentioned problems, an acute-angled edge is formed at the upper end of the hanger which comes into contact with the inner circumferential portion of the magnetic recording medium to prevent the occurrence of the liquid pool. However, in this case, when the level of the liquid lubricant is cut by the edge, a small liquid pool formed at the edge is splashed and the level of the liquid lubricant fluctuates. As a result, unevenness occurs in the thickness distribution of the lubricant film formed on the surface of the magnetic recording medium.

The invention has been made in view of the above-mentioned problems and an object of the invention is to provide a magnetic recording medium manufacturing apparatus capable of forming a lubricant film with a uniform thickness on the surface of a magnetic recording medium.

Solution to Problem

In order to achieve the object, the invention provides the following means.

According to a first aspect of the invention, there is provided a magnetic recording medium manufacturing apparatus that dips a disk-shaped magnetic recording medium with a central hole into a dip tank filled with a liquid lubricant and draws up the magnetic recording medium from the dip tank, thereby forming a lubricant film on a surface of the magnetic recording medium. The magnetic recording medium manufacturing apparatus includes a hanger mechanism that is inserted into the central hole of the magnetic recording medium and supports the magnetic recording medium in a suspended state, and a lifting mechanism that lifts and lowers one of the hanger mechanism and the dip tank relative to the other. The hanger mechanism includes a supporting plate including an upper end which comes into contact with an inner circumferential portion of the magnetic recording medium and a baffle plate that is provided outside the supporting plate so as to be arranged in parallel to the supporting plate. An upper end of the baffle plate is disposed below the upper end of the supporting plate such that a gap is formed between the upper end of the baffle plate and the inner circumferential portion of the magnetic recording medium. The upper end of the baffle plate is higher than the height of a liquid level when liquid separation occurs in a liquid pool formed in a gap between the inner circumferential portion of the magnetic recording medium and the supporting plate.

According to a second aspect of the invention, in the magnetic recording medium manufacturing apparatus according to the first aspect, the hanger mechanism may include a pair of supporting plates having upper ends which come into contact with the inner circumferential portion of the magnetic recording medium, and a pair of baffle plates that are provided outside the pair of supporting plates so as to be arranged in parallel to the supporting plates.

According to a third aspect of the invention, in the magnetic recording medium manufacturing apparatus according to the first or second aspect, a groove portion to which the inner circumferential portion of the magnetic recording medium is fitted may be provided at the upper end of the supporting plate.

According to a fourth aspect of the invention, in the magnetic recording medium manufacturing apparatus according to the third aspect, a slit may be vertically formed in the bottom of the groove portion of the supporting plate.

According to a fifth aspect of the invention, in the magnetic recording medium manufacturing apparatus according to any one of the first to fourth aspects, the hanger mechanism may support a plurality of magnetic recording media arranged in a line.

According to a sixth aspect of the invention, a method of manufacturing a magnetic recording medium is provided. The method includes dipping a disk-shaped magnetic recording medium with a central hole into a dip tank filled with a liquid lubricant while inserting a hanger mechanism into the central hole of the magnetic recording medium to support the magnetic recording medium in a suspended state, and drawing up the magnetic recording medium from the dip tank to form a lubricant film on a surface of the magnetic recording medium. The hanger mechanism includes a supporting plate including an upper end which comes into contact with an inner circumferential portion of the magnetic recording medium, and a baffle plate that is provided outside the supporting plate so as to be arranged in parallel to the supporting plate. An upper end of the baffle plate is disposed below the upper end of the supporting plate such that a gap is formed between the upper end of the baffle plate and the inner circumferential portion of the magnetic recording medium. The upper end of the baffle plate is higher than the height of a liquid level when liquid separation occurs in a liquid pool formed in a gap between the inner circumferential portion of the magnetic recording medium and the supporting plate.

Advantageous Effects of Invention

As described above, in the invention, when the magnetic recording medium is drawn up from the dip tank filled with the liquid lubricant, the baffle plate can prevent fluctuation in the liquid level which occurs when the level of the liquid lubricant is cut by the supporting plate.

Therefore, according to the invention, it is possible to form a lubricant film with a uniform thickness on the surface of the magnetic recording medium while preventing the occurrence of linear coating unevenness in the thickness distribution of the lubricant film formed on the surface of the magnetic recording medium. As a result, it is possible to provide a magnetic recording medium which is suitable for reducing the floating height of a magnetic head and has high abrasion resistance and high environmental resistance.

DESCRIPTION OF EMBODIMENTS

Hereinafter, exemplary embodiments of the invention will be described in detail with reference to the accompanying drawings.

Magnetic Recording Medium Manufacturing Apparatus

Figure 1:
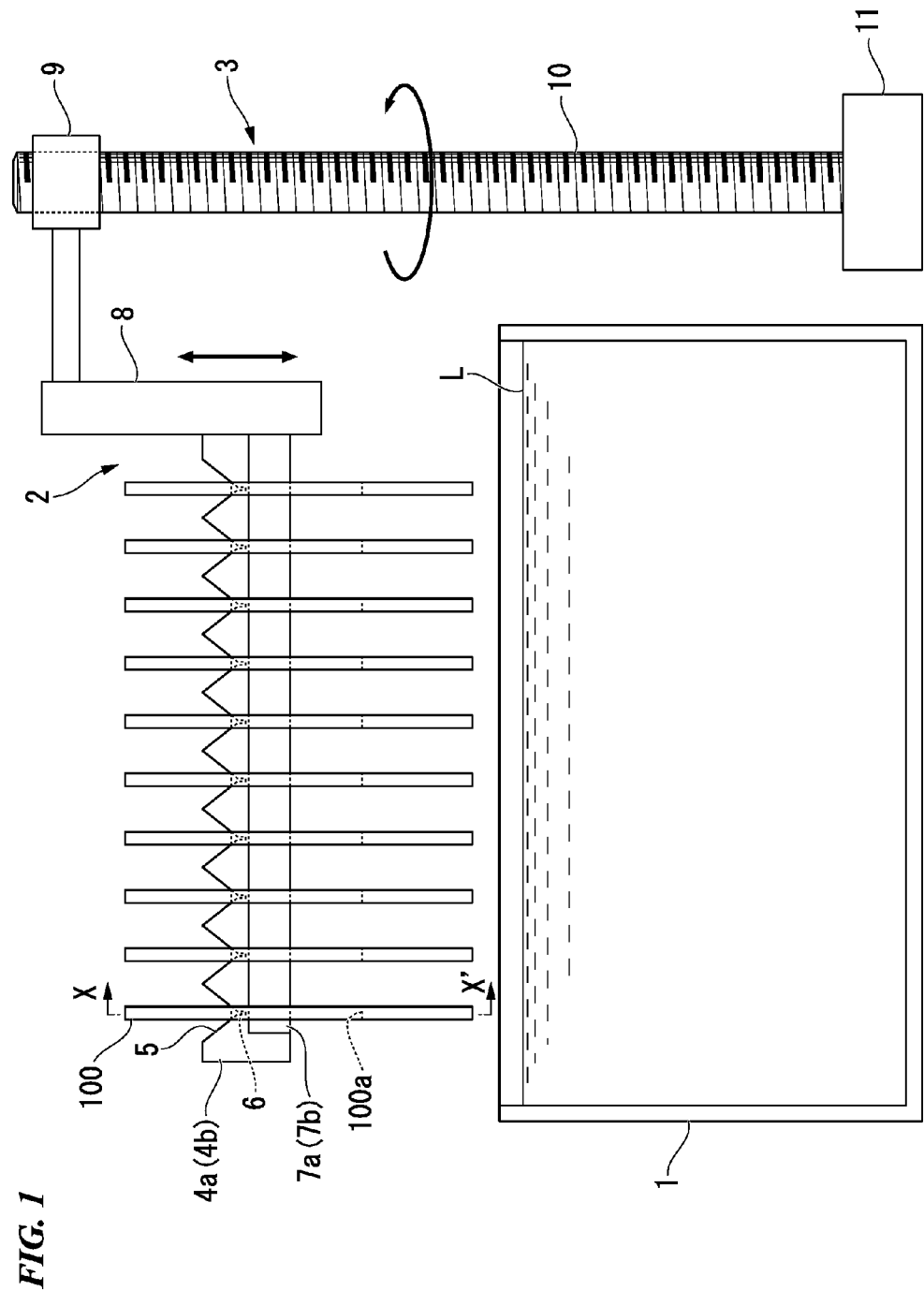
FIG. 1 is a side view illustrating an example of a dipping apparatus according to the invention.
Figure 2:
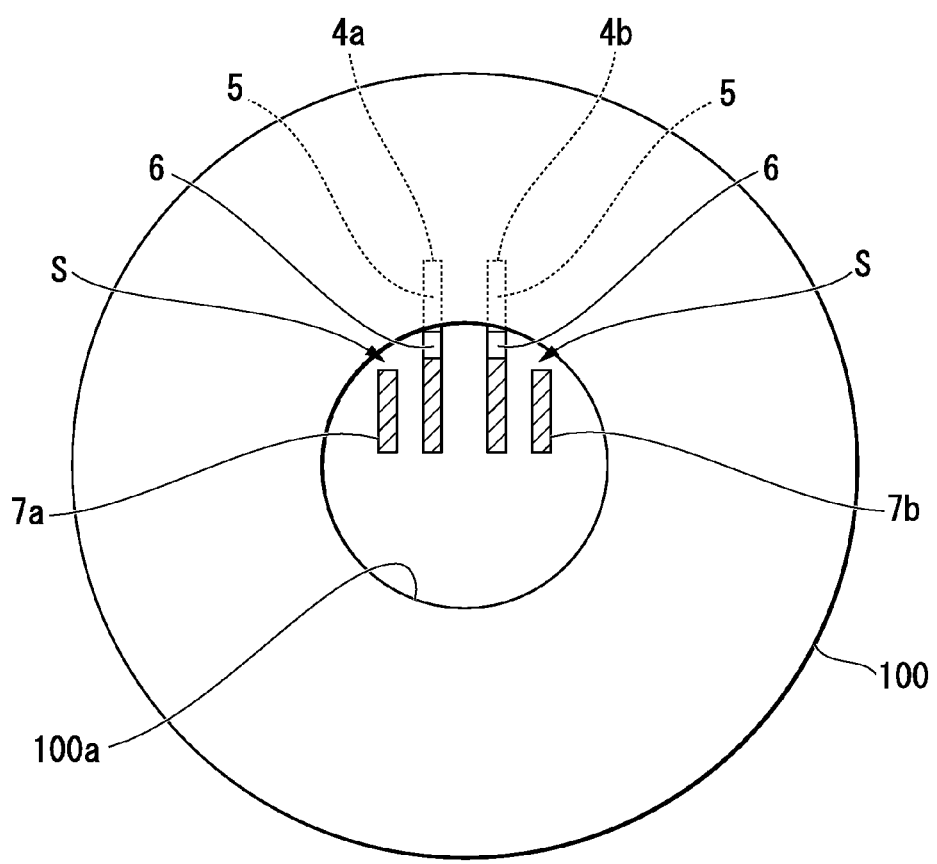
FIG. 2 is a cross-sectional view illustrating a hanger mechanism taken along the line X-X' of FIG. 1.
Figure 3:
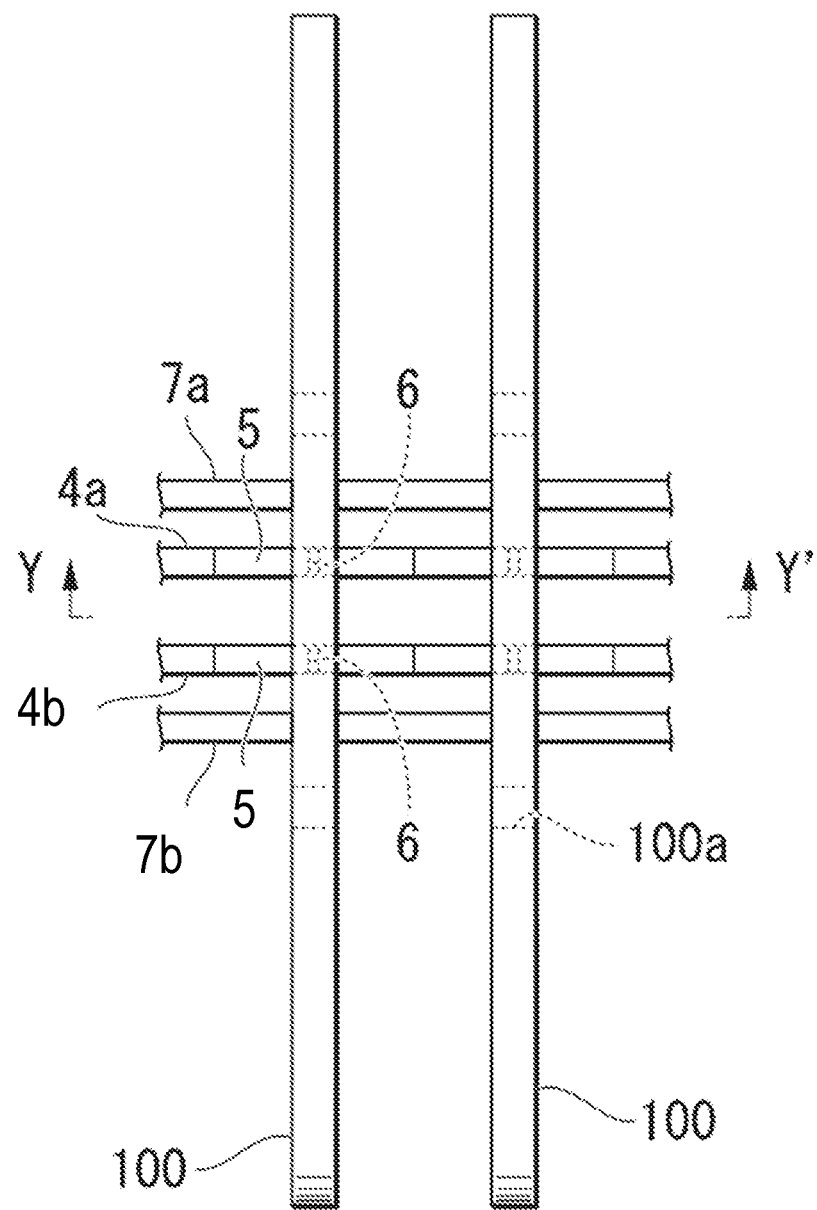
FIG. 3 is a plan view illustrating a main portion of the hanger mechanism shown in FIG. 1, as viewed from the upper side.
Figure 4:
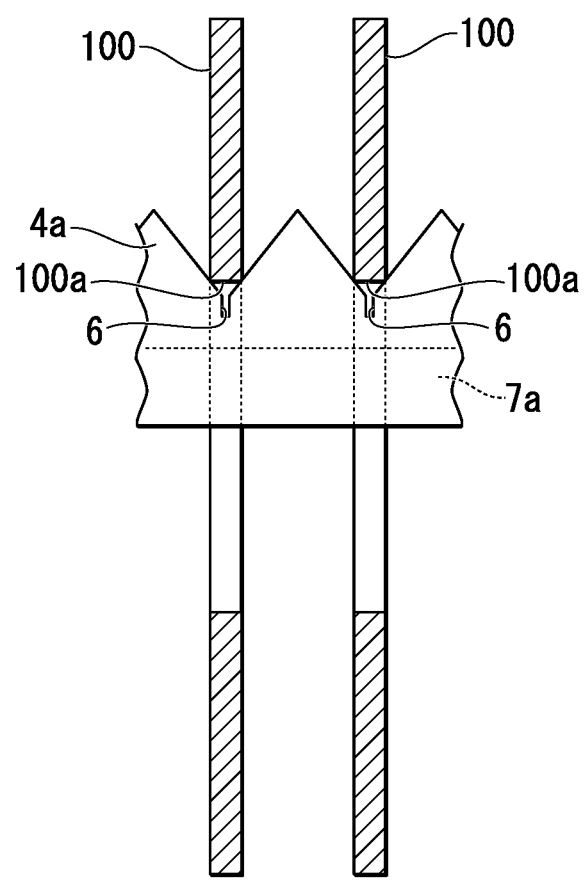
FIG. 4 is a cross-sectional view illustrating the hanger mechanism taken along the line Y-Y' of FIG. 3.

A magnetic recording medium manufacturing apparatus according to the invention is, for example, a so-called dipping apparatus which dips a disk-shaped magnetic recording medium 100 with a central hole 100a into a dip tank 1 filled with a liquid lubricant L and draws up the magnetic recording medium 100 from the dip tank 1, thereby forming a lubricant film on the surface of the magnetic recording medium 100, as shown in FIG. 1.

Specifically, as shown in FIGS. 1, 2, 3, and 4, the dipping apparatus includes a hanger mechanism 2 which is inserted into the central hole 100a of the magnetic recording medium 100 and supports the magnetic recording medium 100 in a suspended state, and a lifting mechanism 3 which lifts or lowers one of the hanger mechanism 2 and the dip tank 1 relative to the other.

The hanger mechanism 2 includes a pair of supporting plates 4a and 4b which are provided so as to extend in parallel to each other in the horizontal direction. A plurality of V-shaped groove portions 5 to which an inner circumferential portion of the magnetic recording medium 100 is fitted are arranged at constant intervals at the upper ends of the pair of supporting plates 4a and 4b. In this way, a plurality of magnetic recording media 100 are supported while being arranged in parallel in the longitudinal direction. In addition, the inner circumferential portion of the magnetic recording medium 100 comes into contact with the groove portions 5 and the magnetic recording medium 100 can be stably held.

Slits 6 are vertically provided in the bottoms of the groove portions 5 of the pair of supporting plates 4a and 4b. The slit 6 rapidly guides the liquid lubricant L which stagnates between the groove portion 5 and the inner circumferential portion of the magnetic recording medium 100 fitted to the groove portion 5 to the lower side and is formed in a linear shape (or a V-shape) with a width less than the thickness of the magnetic recording medium 100 by cutting.

The hanger mechanism 2 includes baffle plates 7a and 7b which are provided outside the pair of supporting plates 4a and 4b so as to extend in parallel to the pair of supporting plates 4a and 4b. The pair of baffle plates 7a and 7b are provided outside the pair of supporting plates 4a and 4b so as to extend in parallel to each other in the horizontal direction. The upper ends of the baffle plates 7a and 7b are lower than the upper ends of the supporting plates 4a and 4b, and a gap S is formed between the upper ends of the baffle plates 7a and 7b and the inner circumferential portion of the magnetic recording medium 100. The lower ends of the supporting plates 4a and 4b and the baffle plates 7a and 7b are higher than a horizontal line passing through the center of the magnetic recording medium 100.

The lifting mechanism 3 is not particularly limited as long as it can dip the magnetic recording medium 100 into the dip tank 1 filled with the liquid lubricant L or draw up the magnetic recording medium 100 from the dip tank 1. For example, the lifting mechanism 3 includes a supporting pole S which supports the base ends of the supporting plates 4a and 4b and the baffle plates 7a and 7b with one end, a nut portion 9 which is attached to the supporting pole 8, a lead screw 10 which is inserted into the nut portion 9, and a driving motor 11 which rotates the lead screw 10. When the driving motor 11 rotates the lead screw 10, the supporting pole 8 is moved in the vertical direction together with the nut portion 9 into which the lead screw 10 is inserted to lift or lower the pair of supporting plates 4a and 4b relative to the dip tank 1.

In the dipping apparatus having the above-mentioned structure, when the magnetic recording medium 100 dipped into the liquid lubricant L in the dip tank 1 is drawn up from the dip tank 1, the baffle plates 7a and 7b can reduce fluctuation in the liquid level which occurs when the level of the liquid lubricant L is cut by the supporting plates 4a and 4b.

Figure 5:
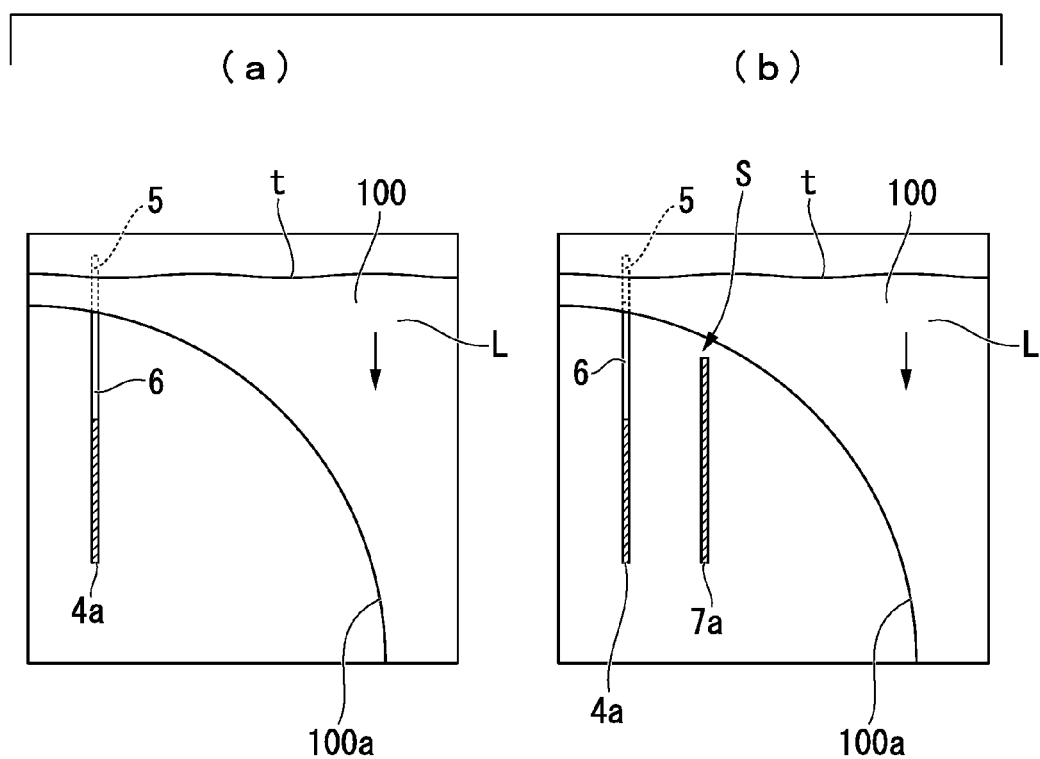
FIG. 5 is a side view illustrating the simulation results obtained from the comparison between the levels of a liquid lubricant when a magnetic recording medium is drawn up from a dip tank and shows a state before a liquid pool is formed.
Figure 6:
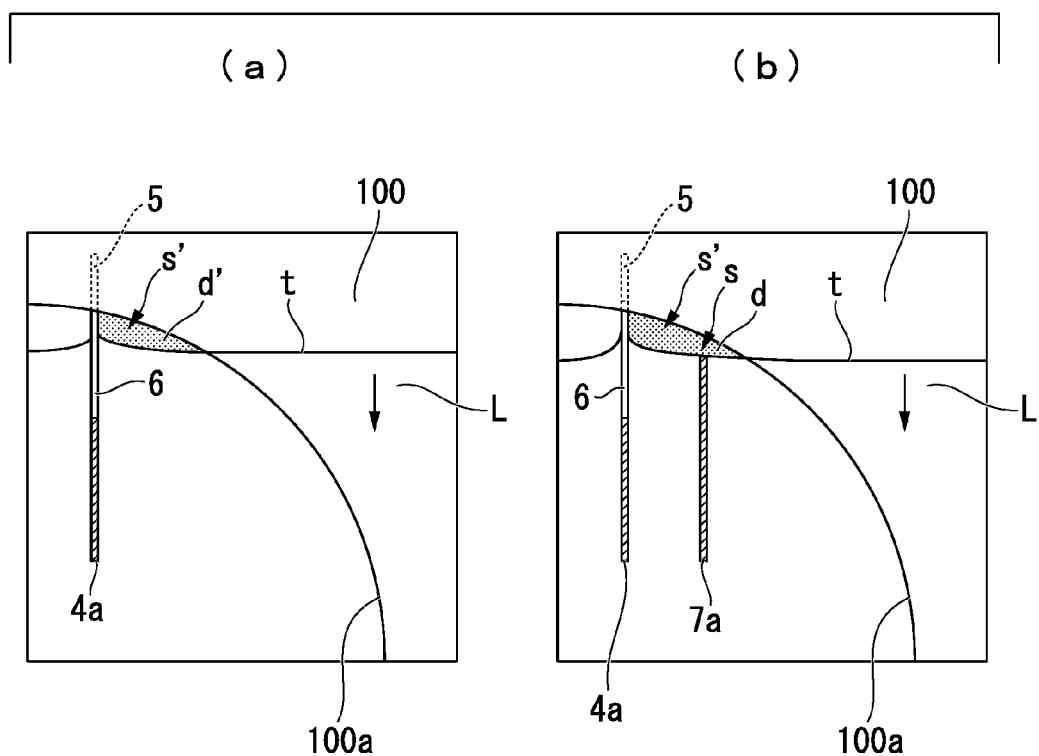
FIG. 6 is a side view illustrating the simulation results obtained from the comparison between the levels of the liquid lubricant when the magnetic recording medium is drawn up from the dip tank and shows a state when the liquid pool is formed.
Figure 7:
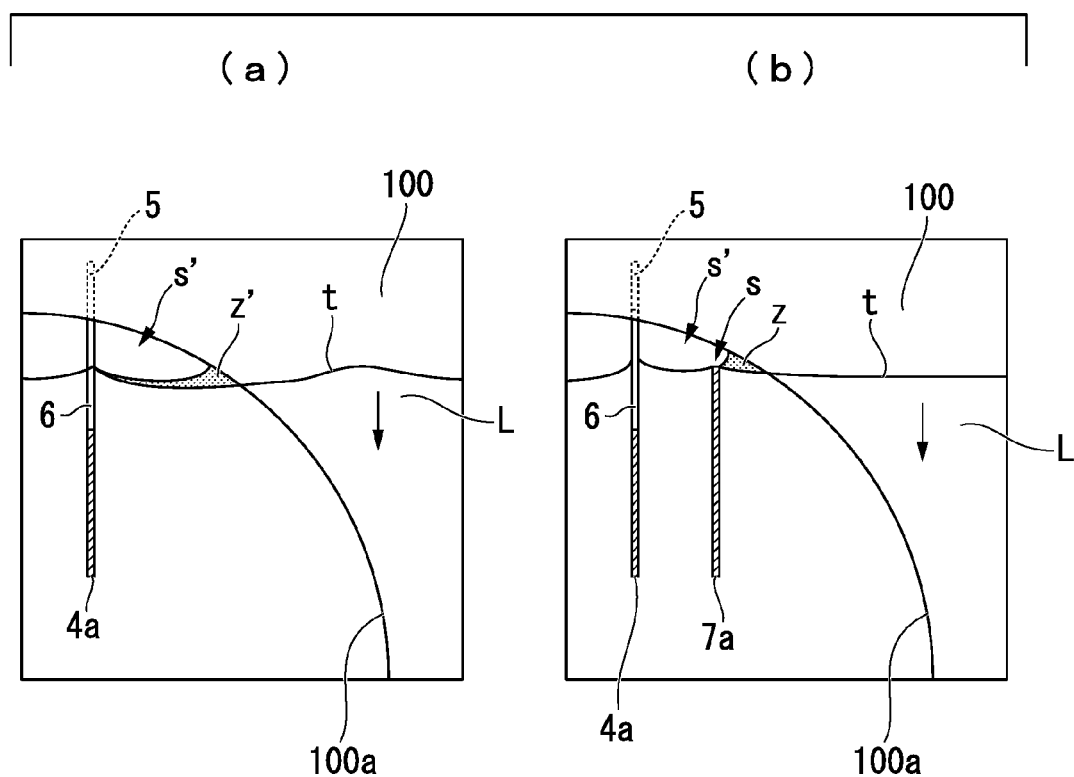
FIG. 7 is a side view illustrating the simulation results obtained from the comparison between the levels of the liquid lubricant when the magnetic recording medium is drawn up from the dip tank and shows a state when the liquid pool is cut.

Specifically, FIGS. 5 to 7 show the simulation results obtained from the comparison between the states of the level of the liquid lubricant L when the dipping apparatus including the baffle plates 7a and 7b according to the invention and a dipping apparatus without including the baffle plates 7a and 7b according to the related art draw up the magnetic recording medium 100 from the dip tank 1.

In the simulation results shown in FIGS. 5 to 7, (a) shows a case in which the dipping apparatus according to the related art is used and (b) shows a case in which the dipping apparatus according to the invention is used. Each of (a) and (b) is an enlarged view illustrating the vicinity of a contact position between the inner circumferential portion of the magnetic recording medium 100 and the supporting plate 4a.

In the dipping apparatus according to the related art, as shown in FIG. 5(a), when the magnetic recording medium 100 dipped into the liquid lubricant L in the dip tank 1 is drawn up from the dip tank 1 at a constant speed, the level t of the liquid lubricant L moves downward along the surface of the magnetic recording medium 100.

As shown in FIG. 6(a), when the contact position between the upper end of the supporting plate 4a and the inner circumferential portion of the magnetic recording medium 100 is higher than the level t of the liquid lubricant L, the level t of the liquid lubricant L which is cut by the upper end of the supporting plate 4a moves downward while forming a liquid pool d' in a gap S' between the inner circumferential portion of the magnetic recording medium 100 and the supporting plate 4a. The liquid pool d' is generated by the surface tension of the liquid lubricant L and is drawn to the level t of the liquid lubricant L which moves downward such that the thickness of the liquid pool d' is gradually reduced.

As shown in FIG. 7(a), when the liquid pool d' is cut, a residual liquid z' forming the liquid pool d is drawn to the level t of the liquid lubricant L and moves up to the level t of the liquid lubricant L along the inner circumferential portion of the magnetic recording medium 100. In this case, a fluctuation corresponding to the difference from the level t caused by the movement of the residual liquid z is transmitted to the level t of the liquid lubricant L. As a result, the level t of the liquid lubricant L fluctuates (varies).

In contrast, in the dipping apparatus according to the invention, as shown in FIG. 5(b), when the magnetic recording medium 100 dipped into the liquid lubricant L in the dip tank 1 is drawn up from the dip tank 1 at a constant speed, the level t of the liquid lubricant L moves downward along the surface of the magnetic recording medium 100.

As shown in FIG. 6(b), when the contact position between the upper end of the supporting plate 4a and the inner circumferential portion of the magnetic recording medium 100 is higher than the level t of the liquid lubricant L, the level t of the liquid lubricant L which is cut by the upper end of the supporting plate 4a moves downward while forming a liquid pool d in a gap S' between the inner circumferential portion of the magnetic recording medium 100, the supporting plate 4a, and the baffle plate 7a. The liquid pool d is generated by the surface tension of the liquid lubricant L and is drawn to the level t of the liquid lubricant L which moves downward such that the thickness of the liquid pool d is gradually reduced.

As shown in FIG. 7(b), when the liquid pool d is cut, a residual liquid z forming the liquid pool d is drawn to the level t of the liquid lubricant L and moves up to the level t of the liquid lubricant L along the inner circumferential portion of the magnetic recording medium 100. In this case, the baffle plate 7a with the upper end slightly higher than the level t prevents a fluctuation corresponding to the difference from the level t caused by the movement of the residual liquid z from being transmitted to the level t of the liquid lubricant L. In this way, it is possible to reduce fluctuation (variation) in the level t of the liquid lubricant L when the level t is cut.

Figure 8:
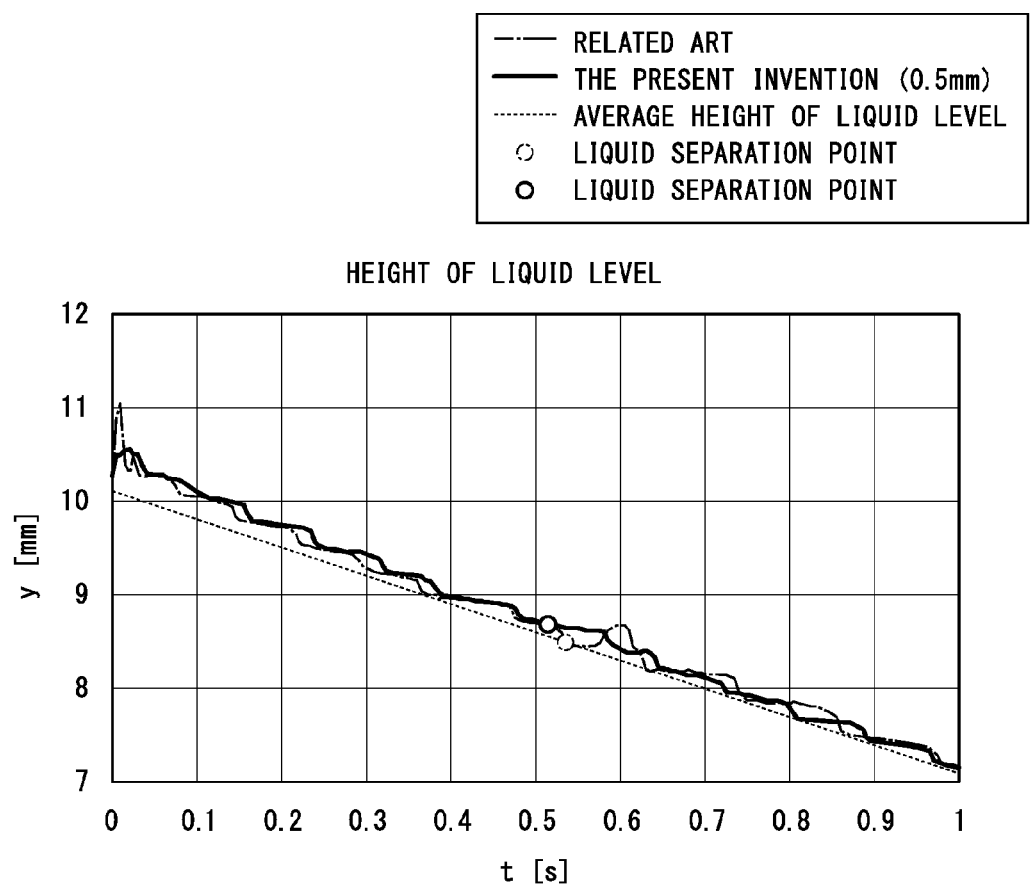
FIG. 8 is a characteristic diagram illustrating a simulation in which the height of the level of the liquid lubricant when the magnetic recording medium is drawn up from the dip tank is measured.
Figure 9:
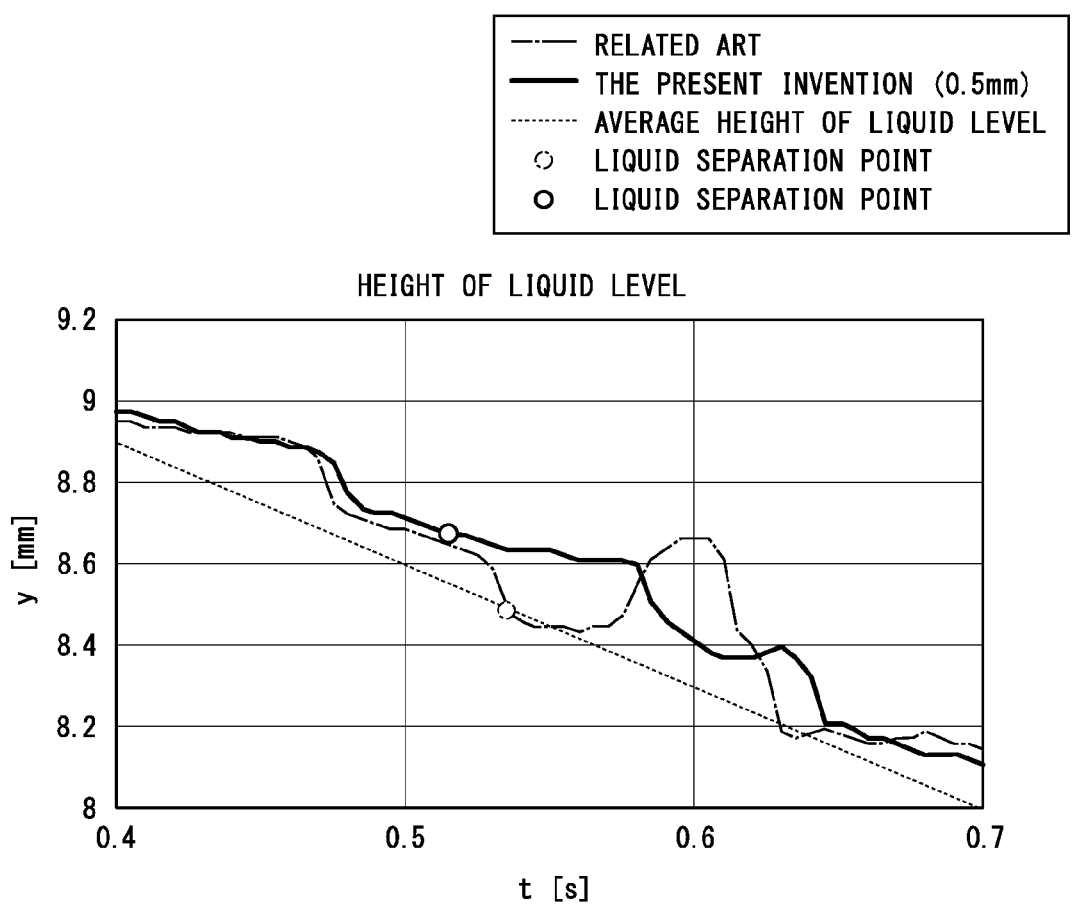
FIG. 9 is an enlarged characteristic diagram illustrating the vicinity of a liquid separation point in the graph shown in FIG. 8.

FIGS. 8 and 9 show the simulation results obtained from the measurement of the height of the level of the liquid lubricant L when the dipping apparatus according to the invention and the dipping apparatus according to the related art draw up the magnetic recording medium 100 from the dip tank 1.

In the simulation, for the dipping apparatus according to the related art, an analysis model was used in which the magnetic recording media 100 with an outside diameter of 65 mm, an inside diameter of 20 mm, and a thickness of 0.8 mm were arranged at intervals of 6.35 mm on the supporting plate 4a (4b) with a thickness of 0.2 mm and a height 7 mm and the slit 6 with a width of 0.3 mm and a depth of 3 mm was provided at the contact position between the inner circumferential portion of the magnetic recording medium and the supporting plate 4a (4b). In contrast, for the dipping apparatus according to the invention, an analysis model was used which was the same as that in the dipping apparatus except that the gap between the supporting plate and the baffle plate was set to 2 mm and the gap S between the inner circumferential portion of the magnetic recording medium 100 and the upper end of the baffle plate 7a (7b) was set to 0.58 mm. In addition, for the liquid lubricant, analysis was performed under conditions such that a surface tension coefficient was a tenth of that of water, a contact angle was set to 60°, and the level t was lowered at a speed of 3 mm/s.

As a result, as shown in FIGS. 8 and 9, the dipping apparatus according to the invention can reduce fluctuation (variation) in the level t of the liquid lubricant L when the level t is cut, as compared to the dipping apparatus according to the related art. FIG. 9 is an enlarged graph illustrating the vicinity of a liquid separation point in the graph shown in FIG. 8.

As described above, the dipping apparatus according to the invention can form a lubricant film with a uniform thickness on the surface of the magnetic recording medium while preventing linear coating unevenness in the thickness distribution of the lubricant film formed on the surface of the magnetic recording medium 100. The use of the dipping apparatus makes it possible to manufacture a magnetic recording medium which is suitable for reducing the floating height of a magnetic head and has high abrasion resistance and high environmental resistance.

Magnetic Recording Medium

Next, the detailed structure of the magnetic recording medium manufactured by the dipping apparatus according to the invention will be described in detail using a discrete magnetic recording medium 30 shown in FIG. 10 as an example.

The magnetic recording medium 30 exemplified in the following description is illustrative. A magnetic recording medium manufactured by the dipping apparatus according to the invention is not necessarily limited to this structure, but may be appropriately changed without departing from the scope and spirit of the invention.

Figure 10:
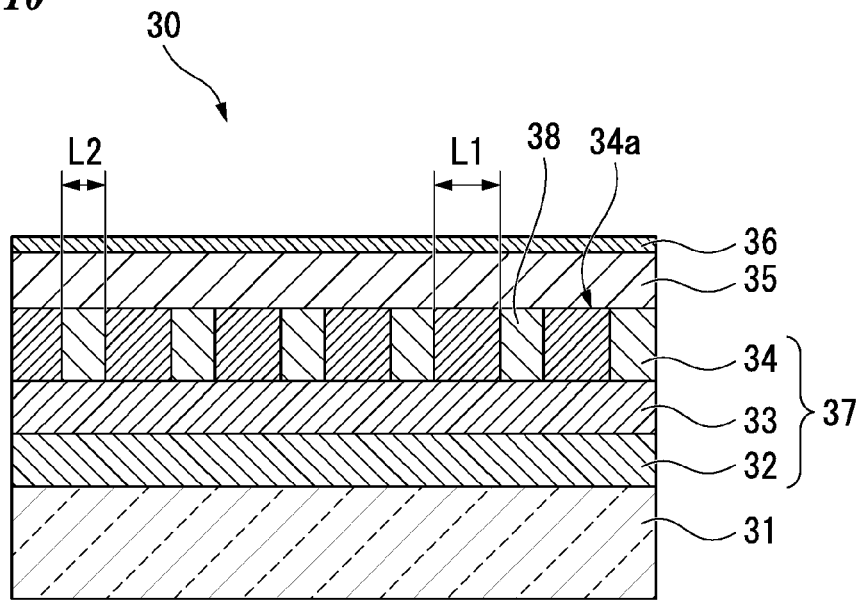
FIG. 10 is a cross-sectional view illustrating an example of the magnetic recording medium.

As shown in FIG. 10, the magnetic recording medium 30 has a structure in which soft magnetic layers 32, intermediate layers 33, recording magnetic layers 34 having a magnetic recording pattern 34a, and protective films 35 are sequentially formed on both surfaces of a non-magnetic substrate 31 and a lubricant film 36 is formed on the outer surface. In addition, a magnetic layer 37 is formed by the soft magnetic layer 32, the intermediate layer 33, and the recording magnetic layer 34. FIG. 10 shows only one surface of the non-magnetic substrate 31.

As the non-magnetic substrate 31, for example, the following various substrates may be used: an Al alloy substrate including Al as a main component, such as an Al—Mg alloy substrate; a glass substrate made of, for example, soda glass, aluminosilicate-based glass, or crystallized glass; a silicon substrate; a titanium substrate; a ceramic substrate; and a resin substrate. Among them, it is preferable to use the Al alloy substrate, the glass substrate, or the silicon substrate. The average surface roughness (Ra) of the non-magnetic substrate 31 is preferably less than or equal to than 1 nm, more preferably less than or equal to than 0.5 nm, and most preferably less than or equal to than 0.1 nm.

The soft magnetic layer 32 is provided in order to increase the number of magnetic flux components which are generated by the magnetic head in the direction perpendicular to the surface of the substrate and strongly fix the magnetization direction of a perpendicular magnetic layer on which information is recorded to the direction perpendicular to the non-magnetic substrate. In particular, this operation is noticeable when a monopole head for perpendicular recording is used as the magnetic head for recording and reproduction.

The soft magnetic layer 32 may be made of a soft magnetic material, such as Fe, Ni, or Co. Examples of the soft magnetic material may include a CoFe-based alloy (for example, CoFeTaZr or CoFeZrNb), a FeCo-based alloy (for example, FeCo or FeCoV), a FeNi-based alloy (for example, FeNi, FeNiMo, FeNiCr, or FeNiSi), a FeAl-based alloy (for example, FeAl, FeAlSi, FeAlSiCr, FeAlSiTiRu, or FeAlO), a FeCr-based alloy (for example, FeCr, FeCrTi, or FeCrCu), a FeTa-based alloy (for example, FeTa, FeTaC, or FeTaN), a FeMg-based alloy (for example, FeMgO), a FeZr-based alloy (for example, FeZrN), a FeC-based alloy, a FeN-based alloy, a FeSi-based alloy, a FeP-based alloy, a FeNb-based alloy, a FeHf-based alloy, and a FeB-based alloy.

The intermediate layer 33 can reduce the size of crystal grains in the magnetic layer to improve recording and reproduction characteristics.

It is preferable that the material forming the intermediate layer 33 have an hcp structure, an fcc structure, or an amorphous structure. In particular, it is preferable to use a Ru-based alloy, a Ni-based alloy, a Co-based alloy, a Pt-based alloy, or a Cu-based alloy, and a multi-layer structure of these alloys may be used. For example, it is preferable to use a multi-layer structure of the Ni-based alloy and the Ru-based alloy, a multi-layer structure of the Co-based alloy and the Ru-based alloy, and a multi-layer structure of the Pt-based alloy and the Ru-based alloy from the substrate.

For example, it is preferable that at least one kind of material selected from a NiW alloy, a NiTa alloy, a NiNb alloy, a NiTi alloy, a NiZr alloy, a NiMn alloy, and a NiFe alloy including 33 at % to 96 at % of Ni be used as the Ni-based alloy. In addition, a non-magnetic material including at least one or two or more of Sc, Y, Ti, Zr, Hf, Nb, Ta, C including 33 at % to 96 at % of Ni may be used. In this case, it is preferable that the content of Ni be in the range of 33 at % to 96 at % so that the effect of the intermediate layer 33 is maintained and the intermediate layer 33 does not have magnetism.

In the case of a multi-layer structure, the thickness of the intermediate layer 33 is preferably in the range of 5 nm to 40 nm and more preferably in the range of 8 nm to 30 nm. When the thickness of the intermediate layer 33 is within the above-mentioned range, in particular, the perpendicular orientation of the soft magnetic layer is significantly improved, and it is possible to reduce the distance between the magnetic head and the soft magnetic layer. Therefore, it is possible to improve recording and reproduction characteristics without reducing the resolution of a reproduction signal.

The recording magnetic layer 34 may be a horizontal magnetic layer for an in-plane magnetic recording medium or a perpendicular magnetic layer for a perpendicular magnetic recording medium. However, it is preferable that the recording magnetic layer 34 be a perpendicular magnetic layer in order to improve recording density.

It is preferable that the recording magnetic layer 34 be made of an alloy including Co as a main component. For example, the recording magnetic layer 34 may be a magnetic layer made of a CoCrPt-based material, a CoCrPtB-based material, or a CoCrPtTa-based material, or a magnetic layer with a granular structure made of a mixture of these materials and an oxide, such as $SiO_2$ or $Cr_2O_3$.

In the case of the perpendicular magnetic recording medium, a laminate of the soft magnetic layer 32 made of, for example, a soft magnetic FeCo alloy (for example, FeCoB, FeCoSiB, FeCoZr, FeCoZrB, or FeCoZrBCu), a FeTa alloy (for example, FeTaN or FeTaC), or a Co alloy (for example, CoTaZr, CoZrNB, or CoB), the intermediate layer 33 made of, for example, Ru, and the recording magnetic layer 34 made of a 60Co-15Cr-15Pt alloy or a 70Co-5Cr-15Pt-10$SiO_2$ alloy may be used. In addition, an orientation control film made of, for example, Pt, Pd, NiCr, or NiFeCr may be formed between the soft magnetic layer 32 and the intermediate layer 33.

In the case of the in-plane magnetic recording medium, a laminate of a non-magnetic CrMo underlying layer and a ferromagnetic CoCrPtTa magnetic layer may be used as the magnetic layer 37.

The thickness of the recording magnetic layer 34 is equal to or more than 3 nm and less than or equal to than 20 nm and preferably equal to or more than 5 nm and less than or equal to than 15 nm. The recording magnetic layer 34 may be formed such that sufficient head input and output are obtained according to the kind of magnetic alloy used and the laminated structure. In general, during reproduction, the thickness of the recording magnetic layer 34 needs to be equal to or more than a predetermined value in order to obtain an output equal to or more than a predetermined value, and various parameters indicating the recording and reproduction characteristics deteriorate with an increase in the output. Therefore, the thickness of the recording magnetic layer 34 needs to be set to an optimal value. In general, the magnetic layer 37 is formed as a thin film by a sputtering method.

It is preferable that the recording magnetic layer 34 with the granular structure include at least Co and Cr as magnetic grains and include one or two or more of a Si oxide, a Cr oxide, a Ti oxide, a W oxide, a Co oxide, a Ta oxide, and a Ru oxide at the boundary between the magnetic grains. Specifically, for example, a CoCrPt—Si oxide, a CoCrPt—Cr oxide, a CoCrPt—W oxide, a CoCrPt—Co oxide, a CoCrPt—Cr oxide—W oxide, a CoCrPt—Cr oxide-Ru oxide, a CoRuPt—Cr oxide-Si oxide, and a CoCrPtRu—Cr oxide-Si oxide may be used.

The average grain diameter of the magnetic crystal grains with the granular structure is preferably greater than or equal to 1 nm and less than or equal to 12 nm. The total amount of oxide in the magnetic layer is preferably in the range of 3 mol % to 15 mol %. In addition, a layer made of a magnetic alloy including Co and Cr, preferably, Pt may be given as an example of the magnetic layer without the granular structure.

The magnetic recording medium 30 is a so-called discrete magnetic recording medium in which the magnetic recording patterns 34a formed in the recording magnetic layer 34 are magnetically separated by a region (for example, a region in which a coercive force is about 80% lower than that in a non-magnetic region or the recording magnetic layer 34) 38 in which magnetic characteristics are modified.

In order to improve the recording density of the discrete magnetic recording medium 30, it is preferable that the width L1 of the magnetic recording pattern 34a be less than or equal to 200 nm and the width L2 of the modified region 38 be less than or equal to 100 nm in the recording magnetic layer 34. In addition, it is preferable that the track pitch P (=L1+L2) of the magnetic recording medium 30 be less than or equal to 300 nm. It is preferable to minimize the track pitch in order to improve the recording density.

The protective film 35 may be made of a material which is generally used in the magnetic recording medium. For example, the protective film 35 may be made of a carbonaceous material, such as carbon (C), hydrogenated carbon (HXC), nitrogenated carbon (CN), amorphous carbon, or silicon carbide (SiC), $SiO_2$, $Zr_2O_3$, or TiN. In addition, the protective film 35 may have a laminated structure of two or more layers. When the thickness of the protective film 35 is greater than 10 nm, the distance between the magnetic head and the magnetic layer 37 increases and it is difficult to obtain sufficient input and output characteristics. Therefore, it is preferable that the thickness of the protective film 35 be less than 10 nm.

The lubricant film 36 may be formed by applying a lubricant made of a fluorine-based material, such as perfluoropolyether, fluorinated alcohol, or fluorinated carboxylic acid, a hydrocarbon-based lubricant, a lubricant made of a mixture of the above-mentioned material onto the protective film 35. In general, the thickness of the lubricant film 36 is in the range of about 1 nm to 4 nm.

It is preferable that an unrefined lubricant for forming a lubricant be chemically stable and have low friction and low absorbency. Specifically, it is preferable to use a fluororesin-based lubricant, such as a perfluoropolyether-based lubricant including a compound with a perfluoropolyether structure.

As the perfluoropolyether-based lubricant, the following lubricant may be used: one kind of perfluoropolyether-based lubricant; a lubricant obtained by combining a cyclic triphosphazene-based lubricant and a perfluoropolyether-based lubricant; or a lubricant obtained by combining a perfluoropolyether compound having a phosphazene ring as an end group and a perfluoropolyether compound having a hydroxyl group as an end group.

Examples of the lubricant include the compound with the perfluoropolyether structure Fomblin Z-DOL and Fomblin Z-TETRAOL (trade name) manufactured by Solvay Solexis, Inc. In addition, an example of the cyclic triphosphazene-based lubricant is X-1p (trade name) manufactured by Dow Chemical Company. An example of the perfluoropolyether compound having the phosphazene ring as the end group is MORESCO PHOSPHAROLA20H-2000 (trade name) manufactured by Matsumura Oil Research Corporation (MORESCO).

The lubricant obtained in this way is dissolved by a solvent to obtain a coating solution with (liquid lubricant) with a concentration suitable for a coating method. As the solution used here, for example, a fluorine-based solution is used, similarly to a solvent for diluting the lubricant.

Then, the coating solution obtained in this way is applied onto the protective film. The application process is performed by a dipping method (deep coating method) using the dipping apparatus according to the invention shown in FIG. 1. The deep coating method involves pouring the coating solution (liquid lubricant L) into the dip tank 1 of the dipping apparatus, dipping a non-magnetic substrate on which each layer including the protective film is formed into the dip tank 1, and drawing up the non-magnetic substrate from the dip tank 1 at a predetermined speed, thereby forming a lubricant film with a uniform thickness on the surface of the protective film on the non-magnetic substrate.

Magnetic Recording and Reproducing Device

Next, a magnetic recording and reproducing device (HDD) to which the invention is applied will be described.

Figure 11:
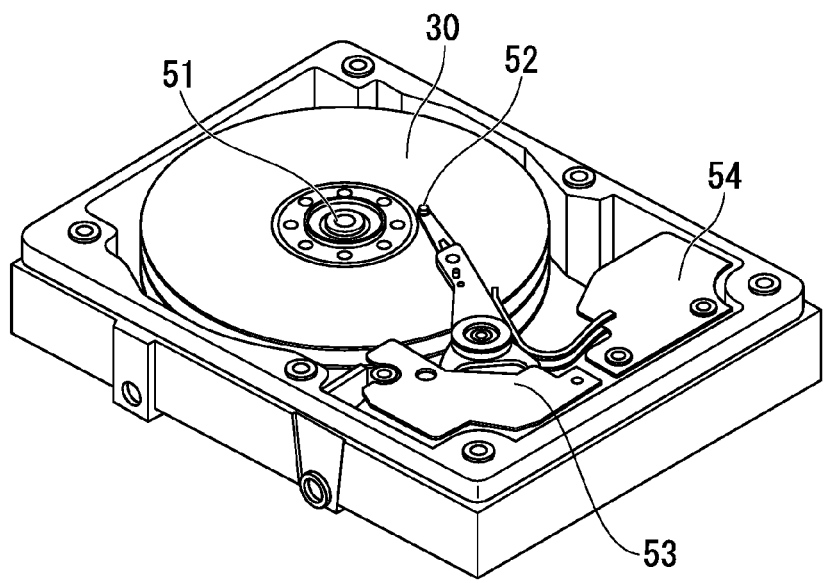
FIG. 11 is a perspective view illustrating an example of a magnetic recording and reproducing device.

For example, as shown in FIG. 11, the magnetic recording and reproducing device to which the invention is applied includes the magnetic recording medium 30, a rotating unit 51 that rotates the magnetic recording medium 30, a magnetic head 52 that performs a recording operation and a reproducing operation on the magnetic recording medium 30, a head driving unit 53 that moves the magnetic head 52 in the diametric direction of the magnetic recording medium 30, and a recording and reproduction signal processing system 54 that inputs a signal to the magnetic head 52 and reproduces a signal output from the magnetic head 52.

In the magnetic recording and reproducing device, since the discrete track magnetic recording medium 30 is used, writing blur does not occur when magnetic recording is performed on the magnetic recording medium 30 and it is possible to obtain high surface recording density. That is, the use of the magnetic recording medium 30 makes it possible to form a magnetic recording and reproducing device with high recording density. In the related art, in order to eliminate the influence of a magnetization transition region, which is an edge portion of the track, the width of the reproducing head is less than that of the recording head. However, when the recording tracks of the magnetic recording medium 30 are magnetically discretely processed, the reproducing head and the recording head may have substantially the same width and operate. In this way, it is possible to obtain a sufficient reproduction output and a high SNR.

When a reproducing unit of the magnetic head 52 is a GMR head or a TMR head, it is possible to obtain sufficient signal intensity even at high recording density and thus achieve a magnetic recording and reproducing device with high recording density. In addition, when the magnetic head 52 floats in the range of 0.005 µm to 0.020 µm, which is lower than that in the related art, an output is improved and a high SNR is obtained. Therefore, it is possible to provide a magnetic recording and reproducing device with high capacity and high reliability.

When a signal processing circuit using a maximum-likelihood decoding method is combined, it is possible to further improve recording density. For example, a sufficient SNR is obtained even when recording and reproduction are performed at a track density of 100 ktracks/inch or more, a linear recording density of 1000 kbits/inch or more, and a recording density of 100 Gbits/square inch.

The invention can be widely applied to a magnetic recording medium including magnetic recording patterns MP which are magnetically separated from each other. Examples of the magnetic recording medium having the magnetic recording patterns include so-called patterned media in which magnetic recording patterns have regularity for one bit, media in which magnetic recording patterns are arranged in a track shape, and magnetic recording media including servo signal patterns. Among them, it is preferable that the invention be applied to a so-called discrete magnetic recording medium in which magnetically separated magnetic recording patterns are magnetic recording tracks and servo signal patterns in order to simplify a manufacturing process.

EXAMPLES

Next, the effect of the invention is clarified by examples. The invention is not limited to the following examples, but various modifications and changes to the invention can be made without departing from the scope and spirit of the invention.

Manufacture of Magnetic Recording Medium

In this example, first, a vacuum chamber in which a HD glass substrate was set was evacuated to $1.0 \times 10^{-5}$ Pa or less in advance. The glass substrate used in this example was made of crystallized glass having $Li_2Si_2O_5$, $Al_2O_3$—$K_2O$, $Al_2O_3$—$K_2O$, $MgO$—$P_2O_5$, and $Sb_2O_3$—$ZnO$ as components and had an outside diameter of 65 mm, an inside diameter of 20 mm, a thickness of 0.8 mm, and an average surface roughness (Ra) of 2 Å.

Then, a FeCoB film with a thickness of 60 nm as a soft magnetic layer, a Ru film with a thickness of 10 nm as an intermediate layer, a 70Co—5Cr—15Pt—10SiO$_2$ alloy film with a thickness of 15 nm as a recording magnetic layer, a 70Co—5Cr—15Pt alloy film with a thickness of 14 nm, and a CVD carbon film with a thickness of 5 nm as a protective film were sequentially formed on the glass substrate by a DC sputtering method.

Example 1

In Example 1, a lubricant was applied onto the magnetic recording medium manufactured by the above-mentioned method. Specifically, a coating solution in which a lubricant was dissolved in a solvent was applied by a dip method using a dipping apparatus, thereby forming a lubricant film with a thickness of 1.5 nm on the surface of the protective film of the magnetic recording medium.

As the dipping apparatus, the same apparatus as the dipping apparatus according to the invention shown in FIGS. 1 to 4 was used. Specifically, a pair of supporting plates with a length of 200 mm, a thickness of 0.2 mm, and a height of 10 mm were arranged in parallel to each other at an interval of 5 mm, 25 magnetic recording media were arranged in V-shaped grooves formed in the pair of supporting plates at intervals of 6.35 mm, and slits with a width of 0.3 mm and a depth of 0.5 mm were provided at the contact positions between the inner circumferential portions of the magnetic recording media and the supporting plates. In addition, baffle plates were provided outside the pair of supporting plates so as to be arranged in parallel to the pair of supporting plates. The baffle plate had a length of 200 mm, a thickness of 0.3 mm, and a height of 6 mm and the gap between the baffle plate and the supporting plate was 3 mm. In addition, the upper end of the baffle plate was disposed below the upper end of the supporting plate and was 0.5 mm higher than the height of the liquid level when a liquid pool formed in the gap between the inner circumferential portion of the magnetic recording medium and the supporting plate was cut.

As the lubricant, Fomblin Z-TETRAOL, which is a compound having a perfluoropolyether structure, was used. In addition, Vertrel XF (trade name) manufactured by Du Pont-Mitsui Fluorochemicals Co., Ltd. was used as a solvent for dissolving the lubricant. The concentration of the lubricant in the coating solution was 0.3 mass %, the drawing-up speed of the magnetic recording medium was 3 mm/s, and the thickness of a coated film was 15 Å.

Comparative Example 1

In Comparative example 1, a lubricant was applied onto a magnetic recording medium by the same method as that in Example 1 except that the baffle plate was not provided in the dipping apparatus.

Evaluation of Magnetic Recording Medium

The thickness distributions of the lubricant films of the magnetic recording media according to Example 1 and Comparative example 2 manufactured as described above were measured. The thickness distribution was measured by an optical surface inspection device, for example, Candela 6100 (trade name) manufactured by KLA-Tencor Corporation (U.S.).

As a result, in the magnetic recording medium according to Comparative example 1, stripes were observed which were formed in a linear shape from the contact position with the supporting plate due to the uneven coating of the lubricant film. In contrast, in the magnetic recording medium according to Example 1, no stripes caused by the uneven coating of the lubricant film were observed. A variation in the thickness of the lubricant film due to the stripes observed in Comparative example 1 was ±2 Å.

INDUSTRIAL APPLICABILITY

The invention can be applied to a magnetic recording medium manufacturing apparatus which dips a disk-shaped magnetic recording medium with a central hole into a dip tank filled with a liquid lubricant and draws up the magnetic recording medium from the dip tank, thereby forming a lubricant film on the surface of the magnetic recording medium.

REFERENCE SIGNS LIST

1: DIP TANK
2: HANGER MECHANISM
3: LIFTING MECHANISM
4a, 4b: SUPPORTING PLATE
5: GROOVE PORTION
6: SLIT
7a, 7b: BAFFLE PLATE
8: SUPPORTING POLE
9: NUT PORTION
10: LEAD SCREW
11: DRIVING MOTOR
30: MAGNETIC RECORDING MEDIUM
31: NON-MAGNETIC SUBSTRATE
32: SOFT MAGNETIC LAYER
33: INTERMEDIATE LAYER
34: RECORDING MAGNETIC LAYER
34a: MAGNETIC RECORDING PATTERN
35: PROTECTIVE FILM
36: LUBRICATION FILM
37: MAGNETIC LAYER
38: MODIFIED REGION
51: ROTATING UNIT
52: MAGNETIC HEAD
53: HEAD DRIVING UNIT
54: RECORDING AND REPRODUCING SIGNAL PROCESSING SYSTEM

The invention claimed is:
1. A method of manufacturing a magnetic recording medium comprising:
dipping a disk-shaped magnetic recording medium with a central hole into a dip tank filled with a liquid lubricant while inserting a hanger mechanism into the central hole of the magnetic recording medium to support the magnetic recording medium in a suspended state; and
taking out the magnetic recording medium from the dip tank in a vertical direction to form a lubricant film on a surface of the magnetic recording medium,
wherein the hanger mechanism includes a supporting plate located within the central hole, and including an upper end having a groove portion into which an inner circumferential portion of the magnetic recording medium is fitted and a baffle plate that is provided within the central hole and facing one side of the supporting plate so as to be arranged in parallel to the supporting plate,
an upper end of the baffle plate is disposed below the upper end of the supporting plate such that a first gap is formed between the upper end of the baffle plate and the inner circumferential portion of the magnetic recording medium,
a liquid pool being formed in a second gap between the inner circumferential portion of the magnetic recording medium and a surface of the groove portion of the supporting plate by the surface tension of the liquid lubricant as the magnetic recording medium is taken out from the dip tank, wherein a thickness of the liquid pool is gradually reduced as the magnetic recording medium is being taken out from the dip tank and at some point the liquid pool is cut and a part of the liquid pool connected to the inner circumferential portion of the magnetic recording medium is moved to a level of the liquid lubricant along the inner circumferential portion of the magnetic recording medium, and
the upper end of the baffle plate is positioned so that it is higher than a height of the liquid level of the liquid lubricant in the dip tank just before the liquid pool is cut and moved up to the level of the liquid lubricant.

2. The method of manufacturing a magnetic recording medium as claimed in claim 1,
wherein the hanger mechanism includes a pair of supporting plates located within the central hole, having inner sides facing one another and having upper ends which come into contact with the inner circumferential portion of the magnetic recording medium and a pair of baffle plates that are provided within the central hole so as to face outer sides of the pair of supporting plates and so as to be arranged in parallel to the supporting plates.

3. The method of manufacturing a magnetic recording medium as claimed in claim 1,
wherein a slit is vertically formed in the bottom of the groove portion of the supporting plate.

4. The method of manufacturing a magnetic recording medium as claimed in claim 1,
wherein the hanger mechanism supports a plurality of magnetic recording media arranged in a line.

* * * * *